US012802657B2

(12) United States Patent
Wu et al.

(10) Patent No.: US 12,802,657 B2
(45) Date of Patent: Nov. 17, 2026

(54) IMAGE CLASSIFICATION SYSTEM APPLYING NEURAL NETWORK TO ADJUST OVERDRIVE SETTINGS

(71) Applicant: REALTEK SEMICONDUCTOR CORP., Hsinchu (TW)

(72) Inventors: Cian-Rou Wu, Hsinchu (TW); Cheng-Yueh Chen, Hsinchu (TW); Sheng-Ju Yang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 19/300,033

(22) Filed: Aug. 14, 2025

(65) Prior Publication Data

US 2026/0112326 A1 Apr. 23, 2026

(30) Foreign Application Priority Data

Oct. 21, 2024 (TW) ................................ 113140028

(51) Int. Cl.

| | |
|---|---|
| ***G06V 10/82*** | (2022.01) |
| ***G06N 3/063*** | (2023.01) |
| ***G09G 3/36*** | (2006.01) |
| *G06V 10/764* | (2022.01) |

(52) U.S. Cl.

CPC ............... *G09G 3/36* (2013.01); *G06N 3/063* (2013.01); *G06V 10/764* (2022.01); *G06V 10/82* (2022.01); *G09G 2320/0252* (2013.01); *G09G 2320/0613* (2013.01); *G09G 2320/08* (2013.01)

(58) Field of Classification Search

CPC ........ G06V 10/82; G06V 10/84; G06V 10/85; G06V 10/86; G06V 10/87; G06V 10/88; G06V 10/94; G06V 10/95; G06V 10/96; G06V 10/764; G06V 10/765; G06V 10/80; G06V 10/803; G06V 10/806; G06V 10/809; G06V 10/811; G06N 3/02; G06N 3/04; G06N 3/042; G06N 3/045; G06N 3/0464; G06N 3/0475; G06N 3/08; G06N 3/084; G06N 3/09; G06N 3/091; G06N 3/092

USPC ........................................................ 345/214

See application file for complete search history.

(56) References Cited

U.S. PATENT DOCUMENTS

| | | | | |
|---|---|---|---|---|
| 9,161,025 | B2 | 10/2015 | Flynn | |
| 2011/0142330 | A1* | 6/2011 | Min | G06T 3/4046 382/159 |
| 2013/0128111 | A1* | 5/2013 | Corral-Soto | H04N 7/0125 348/E7.003 |
| 2020/0202521 | A1* | 6/2020 | Joyce | G06N 3/09 |
| 2022/0335274 | A1* | 10/2022 | Rawat | G06F 18/2431 |

(Continued)

FOREIGN PATENT DOCUMENTS

| | | | |
|---|---|---|---|
| TW | I444955 | B | 7/2014 |
| TW | I759722 | B | 4/2022 |

*Primary Examiner* — Ke Xiao
*Assistant Examiner* — Nelson Lam
(74) *Attorney, Agent, or Firm* — Birch, Stewart, Kolasch & Birch, LLP

(57) ABSTRACT

A display system, a display method, and a training system are provided. The display method includes: receiving, by a classification module, an image, and obtaining a scene classification of the image based on the image; and selecting, by an overdrive module, at least one overdrive look-up table based on the scene classification to send an overdrive signal.

16 Claims, 12 Drawing Sheets

(56) References Cited

U.S. PATENT DOCUMENTS

| | | | | |
|---|---|---|---|---|
| 2023/0215159 | A1* | 7/2023 | Deng | G06V 10/774<br>382/157 |
| 2023/0298360 | A1* | 9/2023 | Yoo | G06V 20/588<br>382/103 |
| 2025/0014324 | A1* | 1/2025 | Li | G06N 3/045 |
| 2025/0252537 | A1* | 8/2025 | Assael | G06T 5/60 |
| 2025/0285337 | A1* | 9/2025 | Galpin | G06N 3/02 |
| 2026/0087647 | A1* | 3/2026 | Zhong | G06T 7/248 |
| 2026/0101053 | A1* | 4/2026 | Rosewarne | H04N 19/33 |

* cited by examiner

| OD LUT | | To | | | | | | | | |
|---|---|---|---|---|---|---|---|---|---|---|
| | | 0 | 32 | 64 | 96 | 128 | 160 | 192 | 224 | 255 |
| From | 0 | 0 | 12 | 18 | 24 | 32 | 40 | 48 | 31 | 0 |
| | 32 | 0 | 0 | 14 | 20 | 26 | 32 | 40 | 31 | 0 |
| | 64 | 0 | −12 | 0 | 13 | 17 | 23 | 30 | 31 | 0 |
| | 96 | 0 | −16 | −11 | 0 | 11 | 19 | 25 | 28 | 0 |
| | 128 | 0 | −22 | −18 | −12 | 0 | 12 | 20 | 26 | 0 |
| | 160 | 0 | −28 | −23 | −16 | −14 | 0 | 14 | 18 | 0 |
| | 192 | 0 | −32 | −27 | −24 | −17 | −12 | 0 | 15 | 0 |
| | 224 | 0 | −32 | −34 | −28 | −22 | −16 | −13 | 0 | 0 |
| | 255 | 0 | −32 | −36 | −33 | −29 | −23 | −17 | −10 | 0 |

IMAGE CLASSIFICATION SYSTEM APPLYING NEURAL NETWORK TO ADJUST OVERDRIVE SETTINGS

CROSS-REFERENCE TO RELATED APPLICATION

This non-provisional application claims priority under 35 U.S.C. § 119 (a) to patent application No. 113140028 filed in Taiwan, R.O.C. on Oct. 21, 2024, the entire contents of which are hereby incorporated by reference.

BACKGROUND

Technical Field

The present invention relates to the field of image display, and in particular, to a technology of applying a neural network to adjust overdrive settings.

Related Art

The current overdrive technology provides a user with an on-screen display (OSD) control option to select an overdrive gear. However, the user needs to manually switch an overdrive gear in different applications (for example, games and documents) to meet the usage situation, and then determine whether the image quality meets the expectation through the screen.

SUMMARY

In view of this, some embodiments of the present invention provide a display system, a display method, and a training system to alleviate the problem in the related art.

Some embodiments of the present invention provide a display system, including a classification module and an overdrive module. The classification module is configured to receive an image and obtain a scene classification of the image based on the image. The overdrive module is configured to select at least one overdrive look-up table based on the scene classification to send an overdrive signal.

Some embodiments of the present invention provide a display method. The display method includes: receiving, by a classification module, an image, and obtaining a scene classification of the image based on the image; and selecting, by an overdrive module, at least one overdrive look-up table based on the scene classification to send an overdrive signal.

Some embodiments of the present invention provide a training system. The training system includes a processing module and a to-be-trained neural network module. The to-be-trained neural network module includes a pre-processing layer, an inception module, an addition module, and an output layer. The pre-processing layer is configured to receive an input image and generate a dimension-reduced feature tensor. The inception module includes a plurality of parallel branch layers and a concatenation module, each of the branch layers receives the dimension-reduced feature tensor and generates an inception feature tensor, and the concatenation module concatenates the inception feature tensor of each branch layer to generate an output inception feature tensor. The addition module is configured to perform an element-by-element addition operation on the output inception feature tensor and the dimension-reduced feature tensor to obtain a residual output. The output layer is configured to receive the residual output and generate a predicted output. The processing module is configured to perform the following in a training epoch: (a) repeatedly: using a training image in a training set as the input image; and obtaining a loss based on a classification label of the training image and the predicted output generated by the output layer corresponding to the training image; and (b) updating a plurality of parameters of the to-be-trained neural network module based on an average of all losses obtained in step (a) and an update algorithm.

Based on the above, some embodiments of the present invention provide a display system, a display method, and a training system. A classification module dynamically identifies a scene classification of a screen, and an overdrive module selects at least one overdrive look-up table based on the scene classification to send an overdrive signal, so that image quality specific to different scenes can be provided.

DETAILED DESCRIPTION

Figures 1, 2:
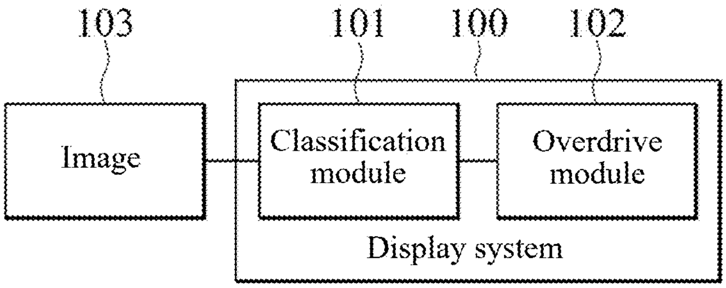
FIG. 1 is a block diagram of a display system according to some embodiments of the present invention.
FIG. 2 is a schematic diagram of an overdrive look-up table according to some embodiments of the present invention.

The foregoing and other technical contents, features, and effects of the present invention will be clearly presented in the following detailed description of embodiments with reference to the accompanying drawings. Any modification and change that do not affect the effects that can be produced and the objectives that can be achieved by the present invention shall still fall within the scope of the technical content disclosed in the present invention. The same reference numerals in all the accompanying drawings are used to represent the same or similar elements. The term "connection" mentioned in the following embodiments may refer to any direct or indirect connection manner, wired or wireless connection manner. In this specification, ordinal words such as "first" or "second" are used to distinguish or relate to same or similar elements or structures, and do not necessarily imply a sequence of these elements on a system. It should be understood that, in some cases or configurations, ordinal words may be used interchangeably without affecting implementation of the present invention.

FIG. 1 is a block diagram of a display system according to some embodiments of the present invention. FIG. 2 is a schematic diagram of an overdrive look-up table according to some embodiments of the present invention. Referring to FIG. 1 and FIG. 2 together, the display system 100 includes a classification module 101 and an overdrive module 102. The display system 100 is configured to receive an image 103. The image 103 is an image to be displayed on a display. The image 103 may be various images of different scene classifications, such as a game image, a document image, and a film and television image. In some embodiments of the present invention, the image 103 is a 3-axis tensor.

In a brightness change process of the display, a liquid crystal molecule is affected by a voltage to generate a torque and rotate to a target to change a light transmittance of a pixel. This reaction time is referred to as a response time. When the reaction time of the liquid crystal molecule is excessively long, phenomena such as smearing and blurring may occur. To eliminate the problem, a higher voltage is applied to accelerate the liquid crystal molecule rotate to the target and reduce the response time. Such a manner is referred to as overdrive. An increased applied voltage is accompanied by overshoot. An overdrive operation uses an overdrive look-up table (as shown in FIG. 2) to determine overdrive values of all pixels in a display region on a display panel.

When images of different scene classifications are displayed, if the display uses different overdrive modes (that is, uses different overdrive look-up tables), a better display effect can be achieved.

A display method and cooperation between modules of the display system 100 according to some embodiments of the present invention are described in detail below with reference to the accompanying drawings.

Figure 11:
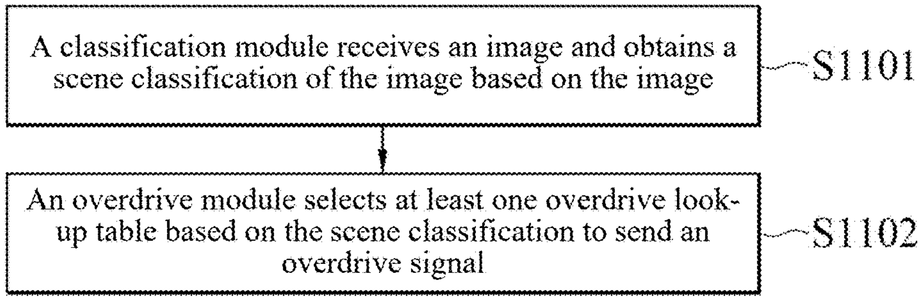
FIG. 11 to FIG. 18 are flowcharts of a display method according to some embodiments of the present invention.

FIG. 11 is a flowchart of a display method according to some embodiments of the present invention. Referring to FIG. 1 and FIG. 11 together, in the embodiment shown in FIG. 11, the display system 100 includes a memory module which stores overdrive look-up tables corresponding to different scene classifications. The display method includes steps S1101 and S1102. In step S1101, the classification module 101 receives the image 103, and obtains a scene classification of the image 103 based on the image 103. In step S1102, the overdrive module 102 selects at least one overdrive look-up table based on the scene category of the image 103 obtained by the classification module 101, to send an overdrive signal to a display module of a display. The display module of the display displays the image 103 based on the settings in the overdrive look-up table indicated by the overdrive signal.

Figure 3A:
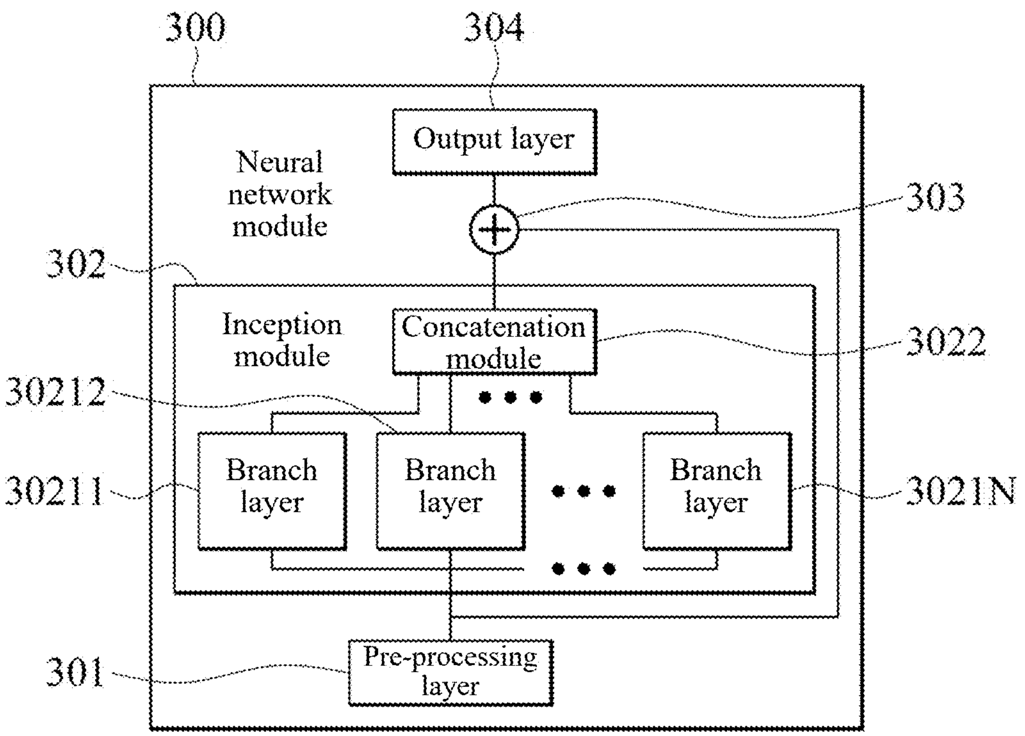
FIG. 3A is a block diagram of a neural network module according to some embodiments of the present invention.
Figure 12:
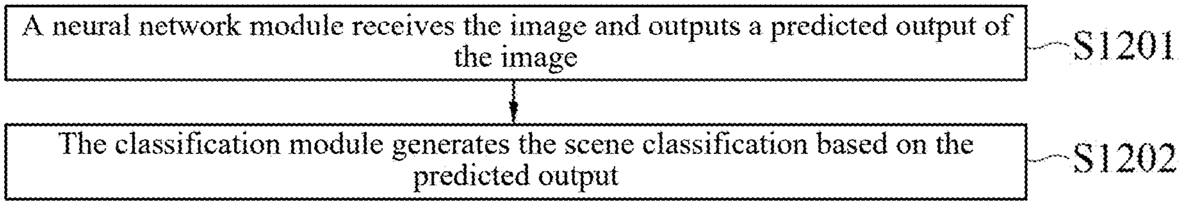

FIG. 3A is a block diagram of a neural network module according to some embodiments of the present invention. FIG. 12 is a flowchart of a display method according to some embodiments of the present invention. Referring to FIG. 1, FIG. 3A, and FIG. 12 together, in some embodiments of the present invention, the classification module 101 includes a neural network module 300. The neural network module 300 is configured to receive the image 103 and output a predicted output of the image 103. In this embodiment, the foregoing step S1101 includes steps S1201 and S1202. In step S1201, the neural network module 300 receives the image 103 and outputs the predicted output of the image 103. In step S1202, the classification module 101 generates the scene classification based on the predicted output generated by the neural network module 300.

Figure 3B:
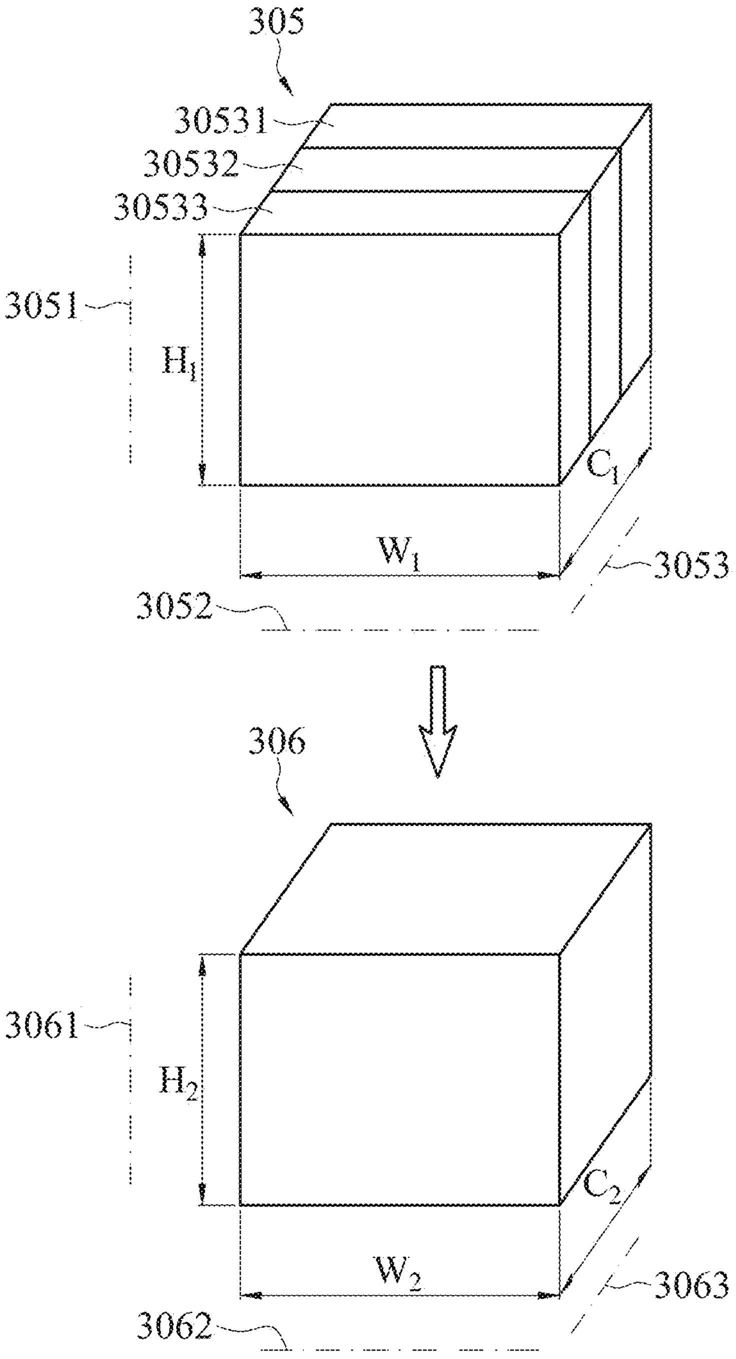
FIG. 3B is a schematic diagram of a dimension-reduced feature tensor according to some embodiments of the present invention.
Figure 3C:
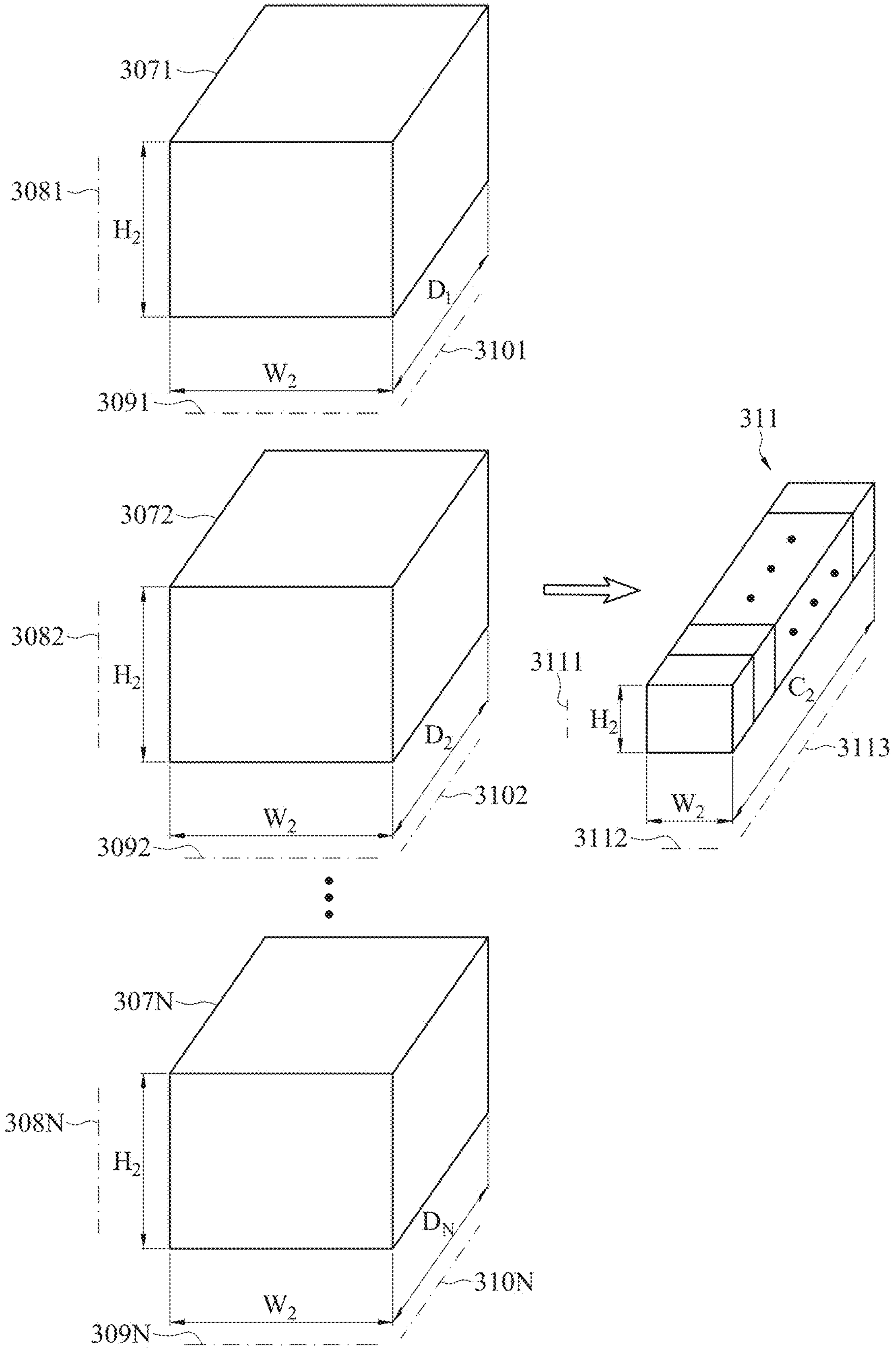
FIG. 3C is a schematic diagram of an inception feature tensor according to some embodiments of the present invention.
Figure 13:
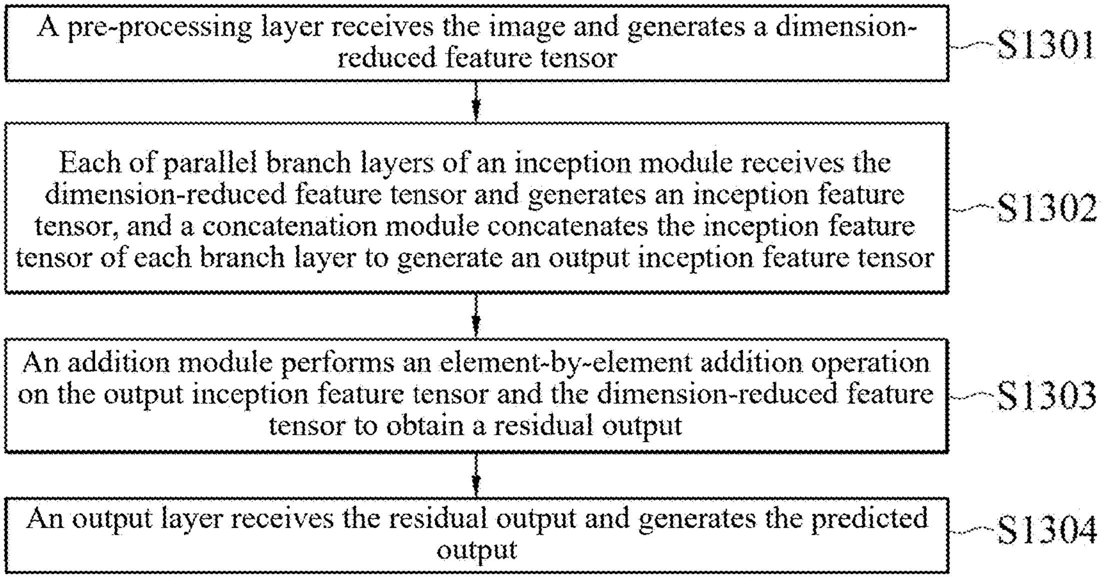

FIG. 3B is a schematic diagram of a dimension-reduced feature tensor according to some embodiments of the present invention. FIG. 3C is a schematic diagram of an inception feature tensor according to some embodiments of the present invention. FIG. 13 is a flowchart of a display method according to some embodiments of the present invention. Referring to FIG. 3A, FIG. 3B, and FIG. 3C together, in some embodiments of the present invention, the neural network module 300 includes a pre-processing layer 301, an inception module 302, an addition module 303, and an output layer 304. The pre-processing layer 301 is configured to receive the image 103 and generate a dimension-reduced feature tensor, where a size of the dimension-reduced feature tensor is less than a size of the image 103. Referring to FIG. 3B, in this embodiment, the image 103 is a 3-axis tensor 305. A dimension of the tensor 305 on a zeroth axis 3051 is $H_1$, a dimension of the tensor 305 on a first axis 3052 is $W_1$, and a dimension of the tensor 305 on a second axis 3053 is $C_1$, where $C_1=3$. Elements (an element 30531, an element 30532, and an element 30533) of the tensor 305 on the second axis 3053 are respectively a red channel, a green channel, and a blue channel of the image 103.

The dimension-reduced feature tensor is a 3-axis tensor 306. A dimension of the tensor 306 on a zeroth axis 3061 is $H_2$, a dimension of the tensor 306 on a first axis 3062 is $W_2$, and a dimension of the tensor 306 on a second axis 3063 is $C_2$. That a size of the dimension-reduced feature tensor is less than a size of the image 103 represents that $H_2<H_1$ and $W_2<W_1$. It should be noted that, in actual application, $H_1$ may be selected to be the same as $W_1$, and $H_2$ may be selected to be the same as $W_2$. In some embodiments of the present invention, $H_1=W_1=1024$, $H_2=W_2=16$, and $C_2=24$.

The inception module 302 includes parallel branch layers 30211 to 3021N and a concatenation module 3022, where N is a positive integer. Each of the branch layers 30211 to 3021N receives the dimension-reduced feature tensor (for example, the tensor 306 shown in FIG. 3B) and generates an inception feature tensor. Sizes of the inception feature tensors generated by each of the branch layers 30211 to 3021N are the same (that is, dimensions of the inception feature tensors generated by each of the branch layers 30211 to 3021N are the same on the zeroth axis, and are also the same on the first axis). The concatenation module 3022 concatenates the inception feature tensors generated by each of the branch layers 30211 to 3021N to generate an output inception feature tensor. Referring to FIG. 3C, based on the embodiment shown in FIG. 3B, in some embodiments of the present invention, the inception feature tensors generated by each of the branch layers 30211 to 3021N are tensors 3071 to 307N respectively. A dimension of the tensor 3071 on a zeroth axis 3081 is $H_2$, and a dimension of the tensor 3071 on a first axis 3091 is $W_2$; a dimension of the tensor 3072 on a zeroth axis 3082 is $H_2$, and a dimension of the tensor 3072 on a first axis 3092 is $W_2$; . . . ; a dimension of the tensor 307N on a zeroth axis 308N is $H_2$, and a dimension of the tensor 307N on a first axis 309N is $W_2$, and so on. A dimension of the tensor 3071 on a second axis 3101 is $D_1$, a dimension of the tensor 3072 on a second axis 3102 is $D_2$, . . . , a dimension of the tensor 307N on a second axis 310N is $D_N$, and so on, where $D_1+D_2+ \dots +D_N=C_2$. As shown in FIG. 3C, the concatenation module 3022 concatenates the inception feature tensors (the tensors 3071 to 307N) generated by each of the branch layers 30211 to 3021N along the second axes 3101 to 310N of the tensors 3071 to 307N to generate an output inception feature tensor 311. A dimension of the output inception feature tensor 311 on a zeroth axis 3111 is $H_2$, a dimension of the output inception feature tensor 311 on a first axis 3112 is $W_2$, and a dimension of the output inception feature tensor 311 on a second axis 3113 is $C_2$.

The addition module 303 is configured to perform an element-by-element addition operation on the output inception feature tensor and the dimension-reduced feature tensor to obtain a residual output. The output layer 304 is configured to receive the residual output and generate a predicted output. Using the foregoing embodiments shown in FIG. 3B and FIG. 3C as an example, the addition module 303 performs an element-by-element addition operation on the output inception feature tensor 311 and the tensor 306 (the dimension-reduced feature tensor) to obtain a residual output.

Referring to FIG. 3A to FIG. 3C and FIG. 13 together, in this embodiment, the foregoing step S1201 includes steps S1301 to S1304. In step S1301, the pre-processing layer 301 receives the image 103 and generates a dimension-reduced feature tensor (for example, the foregoing tensor 306). In step S1302, each of the branch layers 30211 to 3021N of the inception module 302 receives the dimension-reduced feature tensor and generates an inception feature tensor (for example, the foregoing tensors 3071 to 307N), and the concatenation module 3022 concatenates the inception feature tensors generated by the branch layers 30211 to 3021N to generate an output inception feature tensor (for example, the foregoing tensor 311). In step S1303, the addition module 303 performs an element-by-element addition operation on the output inception feature tensor and the dimension-reduced feature tensor to obtain a residual output. In step S1304, the output layer 304 receives the residual output and generates a predicted output.

Figure 4:
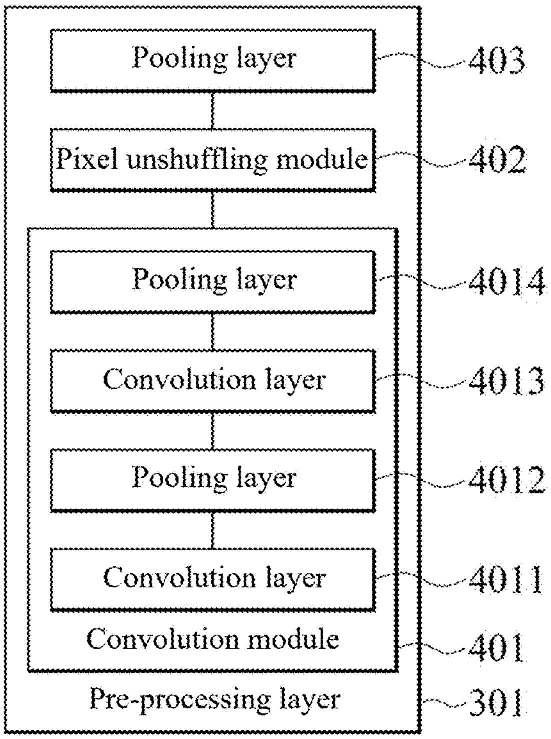
FIG. 4 is a block diagram of a pre-processing layer according to some embodiments of the present invention.
Figure 5A:
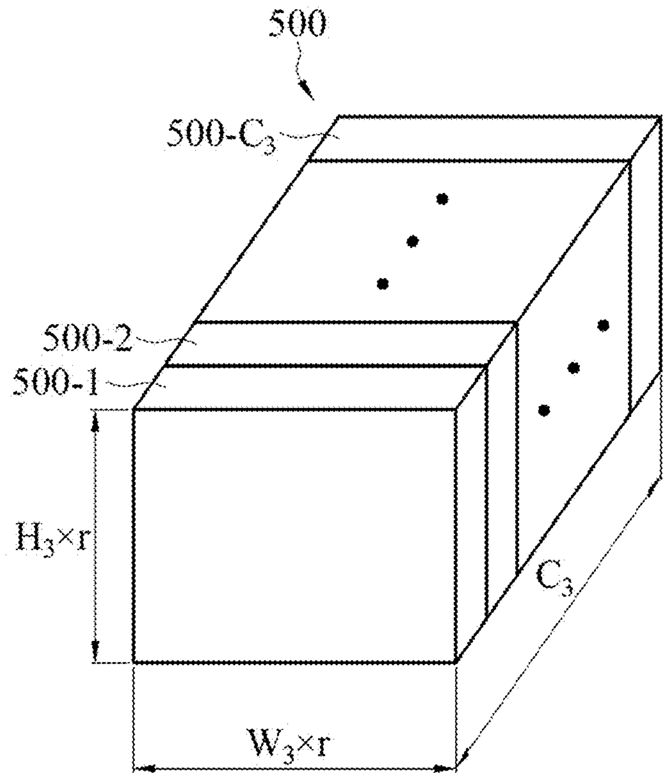
FIG. 5A, FIG. 5B, and FIG. 5C are schematic diagrams of an operation of pixel unshuffling according to some embodiments of the present invention.
Figure 5B:
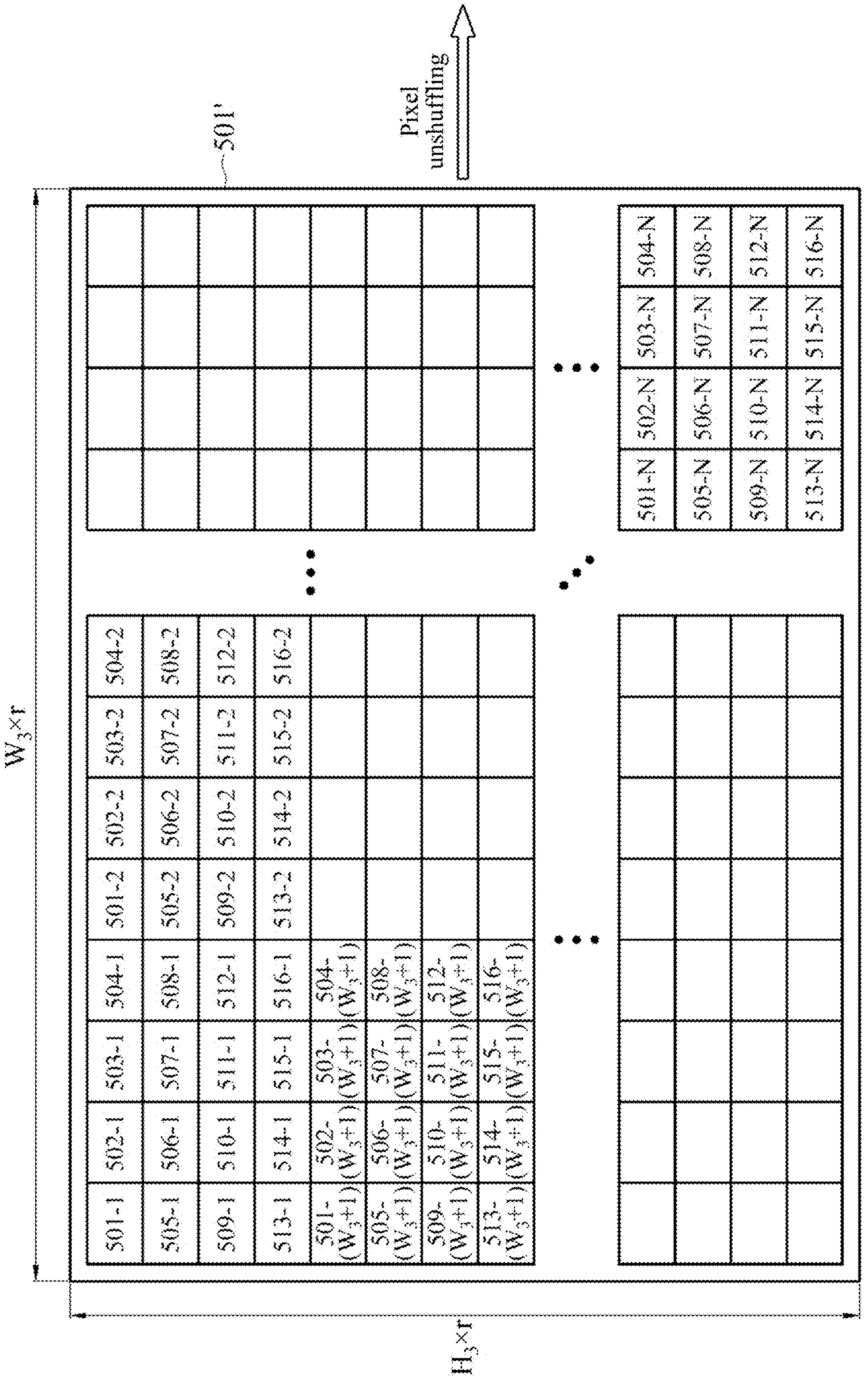
Figure 5C:
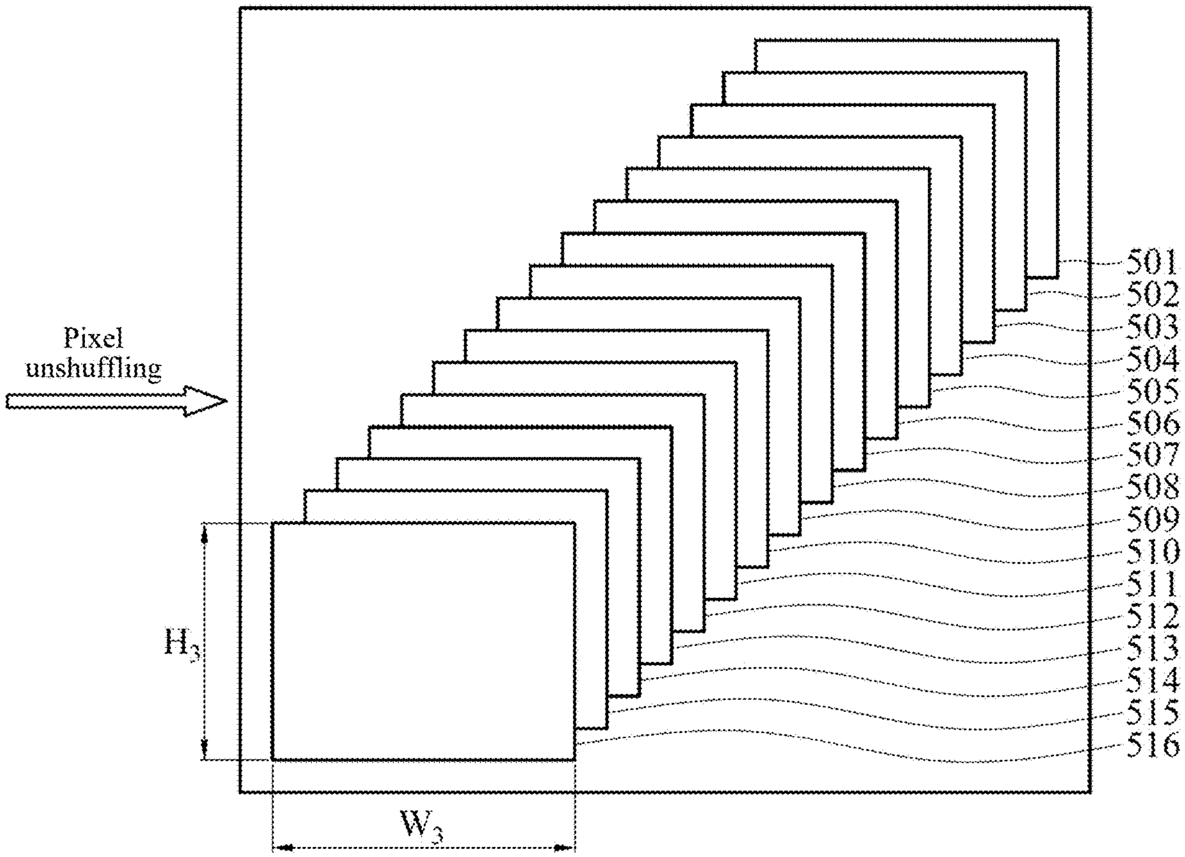
Figure 14:
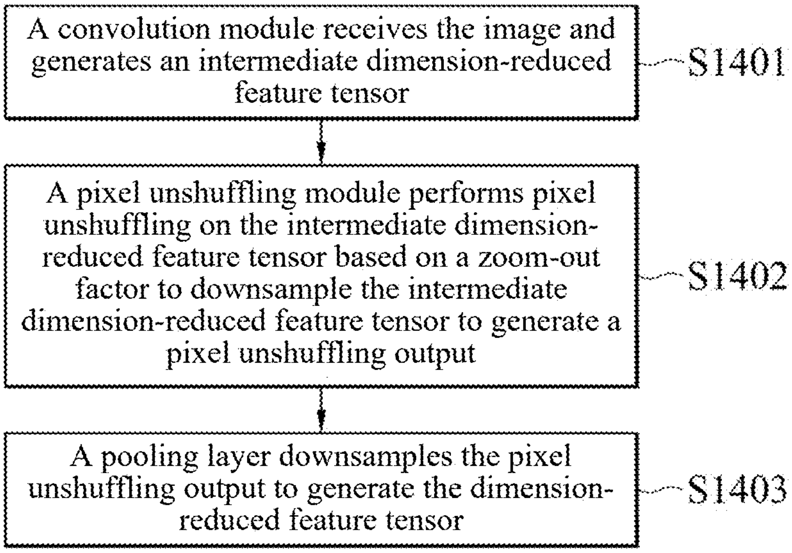

FIG. 4 is a block diagram of a pre-processing layer according to some embodiments of the present invention. FIG. 5A, FIG. 5B, and FIG. 5C are schematic diagrams of an operation of pixel unshuffling according to some embodiments of the present invention. FIG. 14 is a flowchart of a display method according to some embodiments of the present invention. First, referring to FIG. 5A, FIG. 5B, and FIG. 5C together, a tensor 500 is a 3-axis tensor with a dimension of ($H_3$×r, $W_3$×r, $C_3$), where r=4, and $H_3$, $W_3$, and $C_3$ are positive integers. In other words, a dimension of the tensor 500 on a zeroth axis is $H_3$×r, a dimension of the tensor 500 on a first axis is $W_3$×r, and a dimension of the tensor 500 on a second axis is $C_3$. The second axis of the tensor 500 is also referred to as a channel axis of the tensor 500. An operation of performing pixel unshuffling on the tensor 500 is as follows: Based on a zoom-out factor r, for each of elements 500-1 to 500-$C_3$ on the channel axis of the tensor 500, elements spaced apart from each other by r on the zeroth axis and the first axis form new channel elements, to convert the tensor 500 into a 3-axis tensor with a dimension of ($H_3$, $W_3$, $C_3$×$r^2$).

Descriptions are provided below by using an example in which the zoom-out factor r=4. Referring to FIG. 5B and FIG. 5C, a tensor 501' is an element of the tensor 500 on the channel axis of the tensor 500. In the embodiments shown in FIG. 5B and FIG. 5C, on a zeroth axis and a first axis of the tensor 501', elements 50*k*-1 to 50*k*-N are elements spaced apart from each other by r on the zeroth axis and the first axis, where k=1, 2, . . . , 16, and N=$H_3$×$W_3$. Therefore, the elements 50*k*-1 to 50*k*-N form new channel elements 501 to 516 (as shown in FIG. 5C). It should be noted that, when pixel unshuffling is performed, element content of the tensor 500 is not actually changed.

Referring to FIG. 4, FIG. 5A, FIG. 5B, FIG. 5C, and FIG. 14 together, in some embodiments of the present invention, the pre-processing layer 301 includes a convolution module 401, a pixel unshuffling module 402, and a pooling layer 403. In this embodiment, the foregoing step S1301 includes steps S1401 to S1403. In step S1401, the convolution module 401 receives the image 103 and generates an intermediate dimension-reduced feature tensor. In step S1402, the pixel unshuffling module 402 performs pixel unshuffling on the intermediate dimension-reduced feature tensor based on a zoom-out factor (as described in FIG. 5A to FIG. 5C) to downsample the intermediate dimension-reduced feature tensor to generate a pixel unshuffling output. In step S1403, the pooling layer 403 performs a pooling operation on the pixel unshuffling output to generate the dimension-reduced feature tensor.

In some embodiments of the present invention, a dimension of the image 103 is (1024, 1024, 3), and the convolution module 401 is configured to generate an intermediate dimension-reduced feature tensor with a dimension of (64, 64, 6). The pixel unshuffling module 402 performs pixel unshuffling on the intermediate dimension-reduced feature tensor based on a zoom-out factor 2 to generate a pixel unshuffling output with a dimension of (32, 32, 6×$2^2$). The pooling layer 403 is configured to perform a pooling operation on the pixel unshuffling output to generate a dimension-reduced feature tensor with a dimension of (16, 16, 6×$2^2$).

In some embodiments of the present invention, the pooling layer 403 is a max pooling layer. In some embodiments of the present invention, the pooling layer 403 is an average pooling layer.

Still referring to FIG. 4, in some embodiments of the present invention, the convolution module 401 includes a convolution layer 4011, a pooling layer 4012, a convolution layer 4013, and a pooling layer 4014. The foregoing step S1401 includes sequentially processing the image 103 by using the convolution layer 4011, the pooling layer 4012, the convolution layer 4013, and the pooling layer 4014 to generate the intermediate dimension-reduced feature tensor. In some embodiments of the present invention, the pooling layers 4012 and 4014 are max pooling layers. In some embodiments of the present invention, the pooling layers 4012 and 4014 are average pooling layers.

In some embodiments of the present invention, the dimension of the image 103 is (1024, 1024, 3), and the convolution layer 4011 is configured to generate a feature tensor with a dimension of (512, 512, 3). The pooling layer 4012 is configured to generate a feature tensor with a dimension of (256, 256, 3). The convolution layer 4013 is configured to generate a feature tensor with a dimension of (128, 128, 6). The pooling layer 4014 is configured to generate an intermediate dimension-reduced feature tensor with a dimension of (64, 64, 6).

Figure 6:
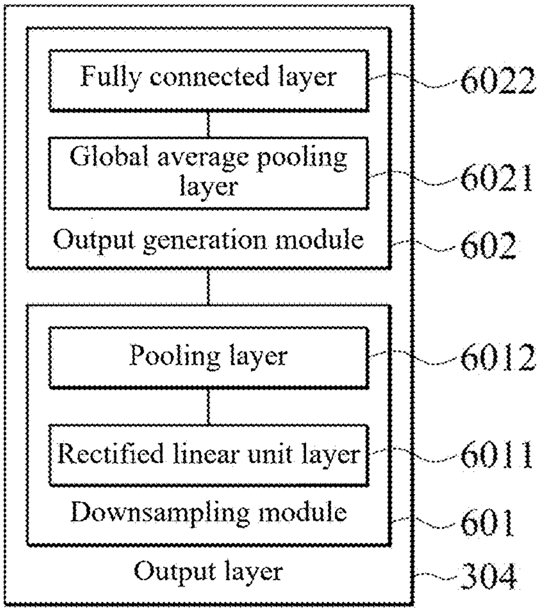
FIG. 6 is a block diagram of an output layer according to some embodiments of the present invention.
Figure 15:
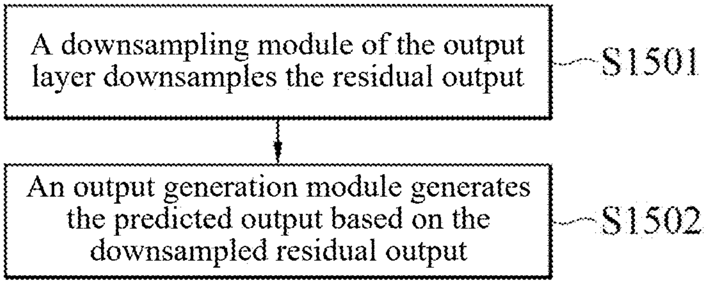

FIG. 6 is a block diagram of an output layer according to some embodiments of the present invention. FIG. 15 is a flowchart of a display method according to some embodiments of the present invention. Referring to FIG. 6 and FIG. 15 together, the output layer 304 includes a downsampling module 601 and an output generation module 602. The foregoing step S1304 includes steps S1501 and S1502. In step S1501, the downsampling module 601 of the output layer 304 downsamples the residual output. In step S1502, the output generation module 602 generates the predicted output based on the residual output after downsampling.

In some embodiments of the present invention, the residual output is a tensor with a dimension of (16, 16, 24). The downsampling module 601 is configured to generate the residual output after downsampling with a dimension of (8, 8, 24). The output generation module 602 is configured to generate the predicted output having a plurality of predicted values. Each predicted value of the predicted output indicates that the image 103 belongs to a category of scene classification. For example, the predicted values of the predicted output are 0.9, 0, 0, 0 in sequence, indicating that the image 103 belongs to a category corresponding to the first predicted value.

Figure 16:
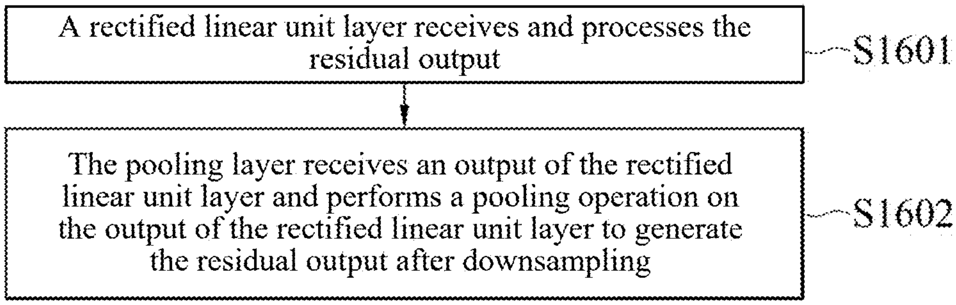

FIG. 16 is a flowchart of a display method according to some embodiments of the present invention. Referring to FIG. 6 and FIG. 16 together, the downsampling module 601 includes a rectified linear unit (ReLU) layer 6011 and a pooling layer 6012. The foregoing step S1501 includes steps S1601 and S1602. In step S1601, the rectified linear unit layer 6011 receives the residual output and performs a rectified linear operation on the received residual output to process the residual output. In step S1602, the pooling layer 6012 receives an output of the rectified linear unit layer 6011, and performs a pooling operation on the output of the rectified linear unit layer 6011 to generate the residual output after downsampling. In some embodiments of the present invention, the pooling layer 6012 is a max pooling layer. In some embodiments of the present invention, the pooling layer 6012 is an average pooling layer.

Based on the foregoing embodiment in which the residual output is a tensor with a dimension of (16, 16, 24), in some embodiments of the present invention, the rectified linear unit layer 6011 receives and processes the residual output to output an output with a dimension of (16, 16, 24). The pooling layer 6012 performs a pooling operation on the output of the rectified linear unit layer 6011 to generate the residual output after downsampling with a dimension of (8, 8, 24).

Figure 7:
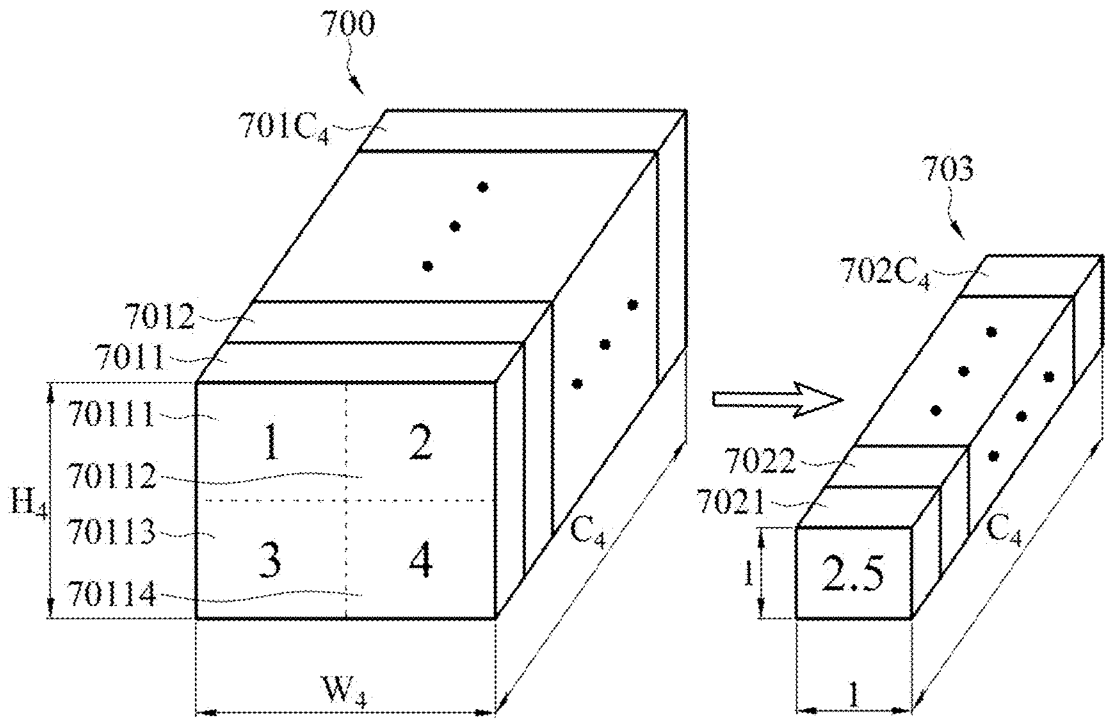
FIG. 7 is a schematic diagram of an operation of a global average pooling layer according to some embodiments of the present invention.

FIG. 7 is a schematic diagram of an operation of a global average pooling layer according to some embodiments of the present invention. A tensor 700 is a 3-axis tensor with a dimension of ($H_4$, $W_4$, $C_4$). A second axis of the tensor 700 is also referred to as a channel axis of the tensor 700. The tensor 700 has elements 7011 to 701$C_4$ on the channel axis. An operation of performing a global average pooling operation on the tensor 700 is: separately averaging each of the elements 7011 to 701$C_4$ on the channel axis of the tensor 700 to convert the tensor 700 into a tensor 703 with a dimension of (1, 1, $C_4$). That is, a value of an element 7021 of the tensor 703 is an average of values of elements included in the element 7011, a value of an element 7022 of the tensor 703 is an average of values of elements included in the element 7012, . . . , a value of an element 702$C_4$ of the tensor 703 is an average of values of elements included in the element 701$C_4$, and so on. For example, the element 7011 includes elements 70111, 70112, 70113, and 70114 with values of 1, 2, 3, and 4, respectively. A value of the element 7021 of the tensor 703 is (1+2+3+4)/4=2.5.

Figure 17:
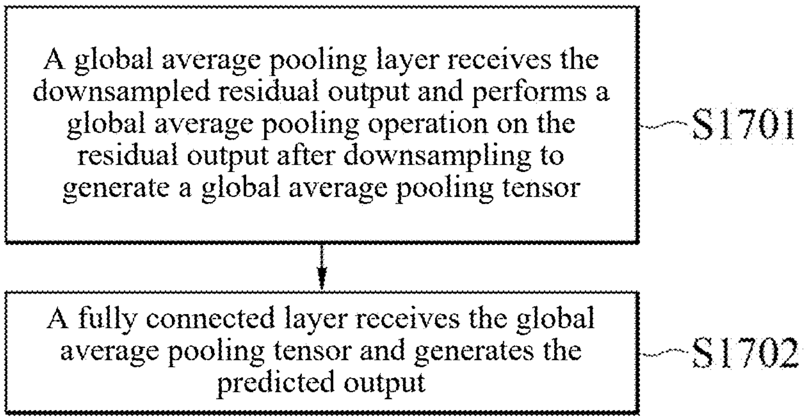

FIG. 17 is a flowchart of a display method according to some embodiments of the present invention. Referring to FIG. 6 and FIG. 17, the output generation module 602 includes a global average pooling layer 6021 and a fully connected layer 6022. The foregoing step S1502 includes steps S1701 and S1702. In step S1701, the global average pooling layer 6021 receives the residual output after downsampling and performs a global average pooling operation on the residual output after downsampling (as described in FIG. 7) to generate a global average pooling tensor. In step S1702, the fully connected layer 6022 receives the global average pooling tensor and generates the predicted output.

In some embodiments of the present invention, the residual output is a tensor with a dimension of (16, 16, 24). The downsampling module 601 is configured to generate the residual output after downsampling with a dimension of (8, 8, 24). The global average pooling layer 6021 converts the residual output after downsampling with a dimension of (8, 8, 24) (as described in FIG. 7) into a global average pooling tensor with a dimension of (1, 1, 24). The fully connected layer 6022 receives the global average pooling tensor with a dimension of (1, 1, 24) and generates the predicted output.

It should be noted that, in the foregoing embodiment, the predicted output is generated by the fully connected layer 6022. However, the predicted output may alternatively be generated in other manners. In some embodiments of the present invention, a normalized exponential (softmax) function is connected after the fully connected layer 6022, and the predicted output is generated by using the normalized exponential function. In this case, each predicted value of the predicted output ranges from 0 to 1. In some embodiments of the present invention, the output generation module 602 includes only the global average pooling layer 6021, and the predicted output is generated by the global average pooling layer 6021.

Figure 8:
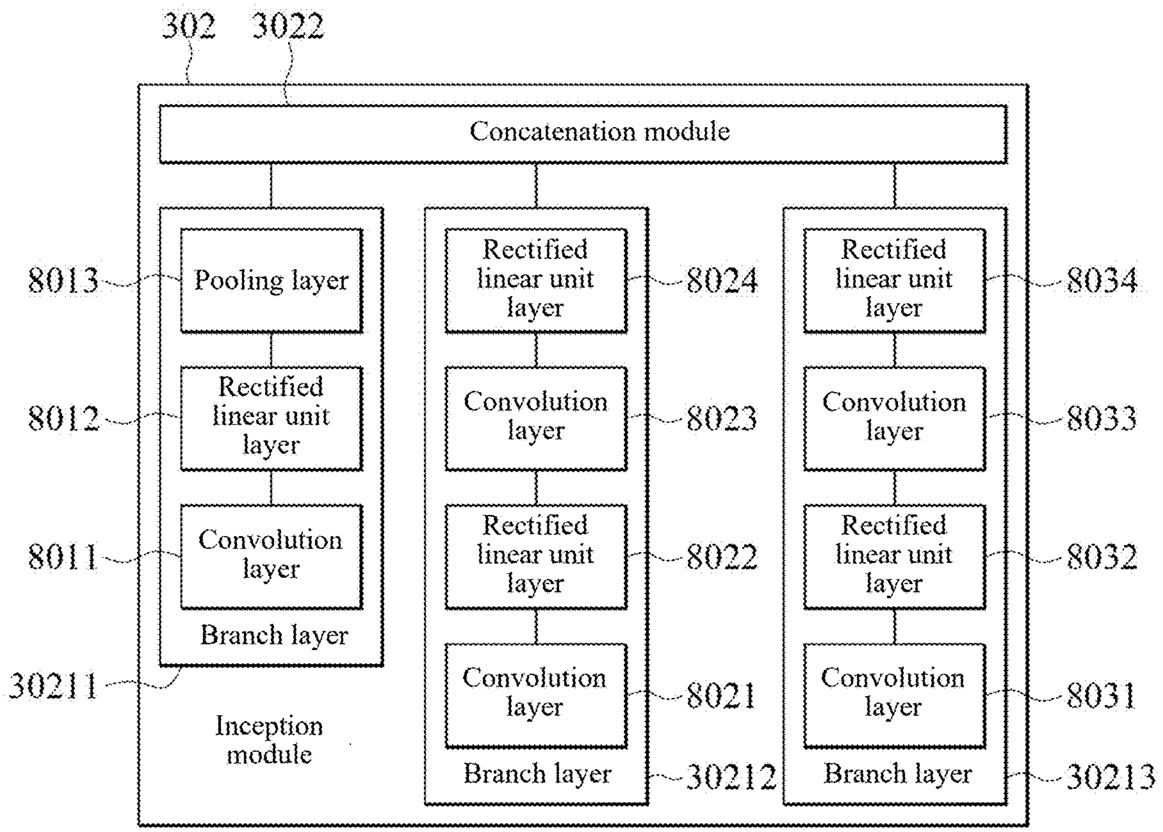
FIG. 8 is a block diagram of an inception module according to some embodiments of the present invention.
Figure 18:
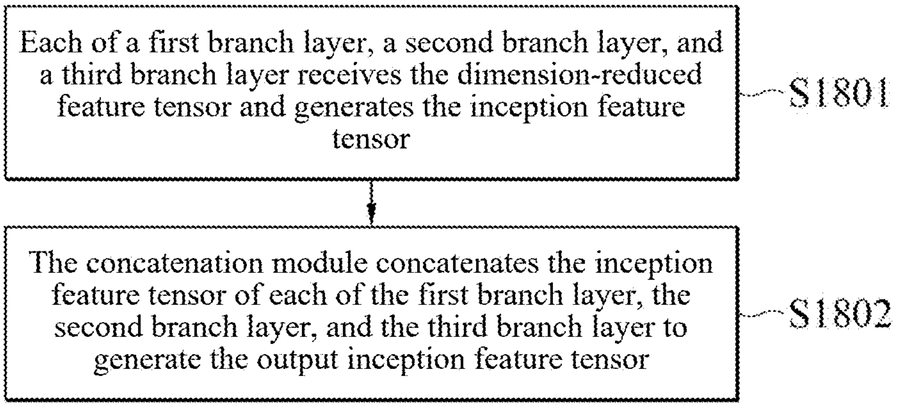

FIG. 8 is a block diagram of an inception module according to some embodiments of the present invention. FIG. 18 is a flowchart of a display method according to some embodiments of the present invention. Referring to FIG. 8 and FIG. 18 together, in some embodiments of the present invention, the inception module 302 includes the parallel branch layers 30211 to 30213 (that is, N=3). For ease of description, in the following description, the branch layer 30211 is referred to as a first branch layer, the branch layer 30212 is referred to as a second branch layer, and the branch layer 30213 is referred to as a third branch layer. As shown in FIG. 8, the first branch layer includes a convolution layer 8011, a rectified linear unit layer 8012, and a pooling layer 8013. The second branch layer includes a convolution layer 8021 (hereinafter referred to as a first convolution layer of the second branch layer for ease of description), a rectified linear unit layer 8022 (hereinafter referred to as a first rectified linear unit layer of the second branch layer for ease of description), a convolution layer 8023 (hereinafter referred to as a second convolution layer of the second branch layer for ease of description), and a rectified linear unit layer 8024 (hereinafter referred to as a second rectified linear unit layer of the second branch layer for ease of description).

The third branch layer includes a convolution layer 8031 (hereinafter referred to as a first convolution layer of the third branch layer for ease of description), a rectified linear unit layer 8032 (hereinafter referred to as a first rectified linear unit layer of the third branch layer for ease of description), a convolution layer 8033 (hereinafter referred to as a second convolution layer of the third branch layer for ease of description), and a rectified linear unit layer 8034 (hereinafter referred to as a second rectified linear unit layer of the third branch layer for ease of description). The convolution layer 8011, the rectified linear unit layer 8012, the pooling layer 8013, the convolution layer 8021, the rectified linear unit layer 8022, the convolution layer 8023, the rectified linear unit layer 8024, the convolution layer 8031, the rectified linear unit layer 8032, the convolution layer 8033, and the rectified linear unit layer 8034 are configured to enable the inception feature tensors generated by each of the branch layers 30211 to 30213 to have a same size (that is, the inception feature tensors generated by each of the branch layers 30211 to 30213 have a same dimension on a zeroth axis, and have a same dimension on a first axis).

In this embodiment, the foregoing step S1302 includes steps S1801 and S1802. In step S1801, each of the first branch layer, the second branch layer, and the third branch layer receives the dimension-reduced feature tensor, and the first branch layer generates an inception feature tensor of the first branch layer based on the convolution layer 8011, the rectified linear unit layer 8012, and the pooling layer 8013; the second branch layer generates an inception feature tensor of the second branch layer based on the first convolution layer, the first rectified linear unit layer, the second convolution layer, and the second rectified linear unit layer of the second branch layer; and the third branch layer generates an inception feature tensor of the third branch layer based on the first convolution layer, the first rectified linear unit layer, the second convolution layer, and the second rectified linear unit layer of the third branch layer.

In step S1802, the concatenation module 3022 concatenates the inception feature tensor of each of the first branch layer, the second branch layer, and the third branch layer to generate the output inception feature tensor.

In some embodiments of the present invention, the pooling layer 8013 is a max pooling layer. In some embodiments of the present invention, the pooling layer 8013 is an average pooling layer.

Based on the foregoing embodiment in which the dimension of the dimension-reduced feature tensor is (16, 16, $6\times2^2$), in some embodiments of the present invention, the convolution layer 8011 is configured to generate a tensor with a size the same as the size of the dimension-reduced feature tensor and with a dimension of 12 on the second axis (that is, a tensor with a dimension of (16, 16, 12)) (for example, by referencing a function Conv2D in tensorflow and setting filters=12, padding="same", and strides=1). The pooling layer 8013 is a max pooling layer, and the pooling layer 8013 is configured to generate a tensor with a dimension the same as the dimension of the tensor output by the convolution layer 8011 (that is, a tensor with a dimension of (16, 16, 12)) (for example, by referencing a function MaxPooling2D in tensorflow and appropriately setting parameters of MaxPooling2D).

The first convolution layer of the second branch layer is configured to generate a tensor with a size the same as the size of the dimension-reduced feature tensor and with a dimension of 12 on the second axis (that is, a tensor with a dimension of (16, 16, 12)), and the second convolution layer of the second branch layer is configured to generate a tensor with a size the same as the size of the tensor output by the first convolution layer of the second branch layer and with a dimension of 6 on the second axis (that is, a tensor with a dimension of (16, 16, 6)). The first convolution layer of the third branch layer is configured to generate a tensor with a size the same as the size of the dimension-reduced feature tensor and with a dimension of 12 on the second axis (that is, a tensor with a dimension of (16, 16, 12)), and the second convolution layer of the third branch layer is configured to generate a tensor with a size the same as the size of the tensor output by the first convolution layer of the third branch layer and with a dimension of 6 on the second axis (that is, a tensor with a dimension of (16, 16, 6)).

Still referring to FIG. 1, in some embodiments of the present invention, the classification module 101 and the overdrive module 102 are integrated into a same integrated circuit.

Figure 9:
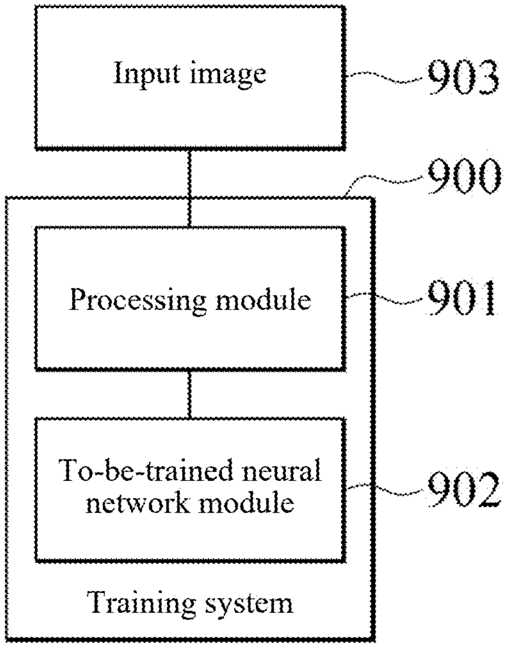
FIG. 9 is a block diagram of a training system according to some embodiments of the present invention.

FIG. 9 is a block diagram of a training system according to some embodiments of the present invention. Referring to FIG. 9, the training system 900 includes a processing module 901 and a to-be-trained neural network module 902. The processing module 901 is configured to obtain an input image 903. An architecture of the to-be-trained neural network module 902 is the same as an architecture of the neural network module 300 shown in FIG. 3A, including a pre-processing layer 301, an inception module 302, an addition module 303, and an output layer 304. The processing module 901 is configured to perform a first step and a second step in a training epoch. In the first step, the processing module 901 repeatedly performs the following steps: inputting a training image in a training set as the input image 903 into the pre-processing layer 301, and obtaining a loss based on a classification label of the training image and a predicted output generated by the training image corresponding to the output layer 304. In the second step, the processing module 901 updates a plurality of parameters of the to-be-trained neural network module 902 based on an average of all losses obtained in the first step and an update algorithm.

The update algorithm may be one of a gradient descent (GD) method, a stochastic gradient descent method, a momentum method, an RMSProp method, an Adagrad method, and an adaptive moment estimation (Adam) method, or another update algorithm.

Still referring to FIG. 1, in some embodiments of the present invention, the image 103 includes images of different scene classifications in different regions. For example, an upper left of the image includes a region of a film and television image, and a right of the image includes a region of a document image. In addition to the neural network module 300, the classification module 101 further includes an image object detection module. The image object detection module is configured to receive the image 103 and detect regions belonging to different scene classifications in the image 103 based on a trained object detection model (for example, an upper left of the image includes a region of a film and television image, and a right of the image includes a region of a document image). Definitely, the object detection model may detect that the entire image 103 belongs to a same scene classification. The classification module 101 then separately inputs images of the regions belonging to different scene classifications in the image 103 into the neural network module 300 to obtain the scene classification of each of the regions belonging to different scene classifications in the image 103.

Figure 10:
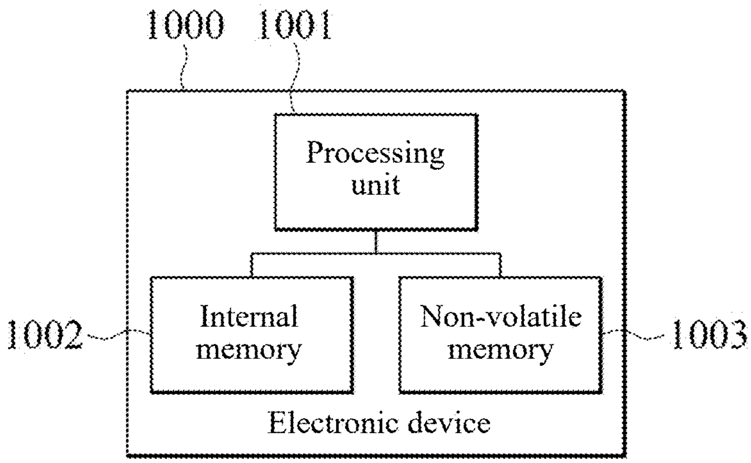
FIG. 10 is a schematic block diagram of a system of an electronic device according to some embodiments of the present invention.

FIG. 10 is a schematic block diagram of a system of an electronic device according to some embodiments of the present invention. As shown in FIG. 10, on a hardware level, the electronic device 1000 includes a processing unit 1001, an internal memory 1002, and a non-volatile memory 1003. The internal memory 1002 is, for example, a random access memory (RAM). The non-volatile memory 1003 is, for example, at least one magnetic disk memory.

The internal memory 1002 and the non-volatile memory 1003 are configured to store programs. The programs may include program code, and the program code includes computer operation instructions. The internal memory 1002 and the non-volatile memory 1003 provide instructions and data to the processing unit 1001. The processing unit 1001 reads a corresponding computer program from the non-volatile memory 1003 into the internal memory 1002 and then runs the program, to form a display system 100 on a logical level. The neural network module 300 may be stored in the internal memory 1002 and the non-volatile memory 1003 in a software form, or may be implemented as hardware. In some embodiments of the present invention, after serving as the processing module 901 and reading the corresponding computer program from the non-volatile memory 1003 into the internal memory 1002 for execution, the processing unit 1001 performs a first step and a second step that are performed in a training epoch.

The processing unit 1001 may be an integrated circuit chip, and has a signal processing capability. In an implementation process, the methods and steps disclosed in the foregoing embodiments may be implemented by using a hard integrated logic circuit or an instruction in a software form in the processing unit 1001. The processing unit 1001 may be a general-purpose processor, including a central processing unit, a digital signal processor, an application-specific integrated circuit, a field programmable gate array, or another programmable logic device, and may implement or perform the methods and steps disclosed in the foregoing embodiments.

An embodiment of this specification further provides a computer-readable storage medium. The computer-readable storage medium stores at least one instruction. The at least one instruction, when executed by the processing unit 1001 of the electronic device 1000, enables the processing unit 1001 of the electronic device 1000 to perform the methods and steps disclosed in the foregoing embodiments.

Examples of the storage medium of the computer include, but are not limited to, a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another internal memory technology, a read-only compact disc read-only memory (CD-ROM), a digital versatile disc (DVD) or another optical storage, a magnetic cassette tape, a tape-type magnetic disk storage or another magnetic storage device, or any other non-transmission medium, which may be configured to store information that may be accessed by a computing device. As defined in this specification, the computer-readable medium does not include a transitory medium, such as a modulated data signal and a carrier.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A display system, comprising:

a classification module, configured to receive an image and obtain a scene classification of the image based on the image; and an overdrive module, configured to select at least one overdrive look-up table based on the scene classification to send an overdrive signal; wherein the classification module comprises a neural network module, configured to receive the image and output a predicted output of the image; and the classification module generates the scene classification based on the predicted output; wherein the neural network module comprises:

a pre-processing layer, configured to receive the image and generate a dimension-reduced feature tensor;

an inception module, comprising a plurality of parallel branch layers and a concatenation module, each of the branch layers being configured to receive the dimension-reduced feature tensor and generate an inception feature tensor, and the concatenation module being configured to concatenate the inception feature tensor of each branch layer to generate an output inception feature tensor;

an addition module, configured to perform an element-by-element addition operation on the output inception feature tensor and the dimension-reduced feature tensor to obtain a residual output; and an output layer, configured to receive the residual output and generate the predicted output; and the classification module generates the scene classification based on the predicted output.

2. The display system according to claim 1, wherein the pre-processing layer comprises a convolution module, a pixel unshuffling module, and a pooling layer; the convolution module is configured to receive the image and generate an intermediate dimension-reduced feature tensor; the pixel unshuffling module is configured to perform pixel unshuffling on the intermediate dimension-reduced feature tensor based on a zoom-out factor to downsample the intermediate dimension-reduced feature tensor to generate a pixel unshuffling output; and the pooling layer is configured to downsample the pixel unshuffling output to generate the dimension-reduced feature tensor.

3. The display system according to claim 2, wherein the pooling layer is a max pooling layer.

4. The display system according to claim 1, wherein the output layer comprises a downsampling module and an output generation module; and the downsampling module of the output layer is configured to downsample the residual output, and the output generation module is configured to generate the predicted output based on the residual output after downsampling.

5. The display system according to claim 4, wherein the downsampling module comprises a rectified linear unit layer and a pooling layer, the rectified linear unit layer is configured to receive and process the residual output, and the pooling layer is configured to receive an output of the rectified linear unit layer and perform a pooling operation on the output of the rectified linear unit layer to generate the residual output after downsampling.

6. The display system according to claim 4, wherein the output generation module comprises a global average pooling layer and a fully connected layer, the global average pooling layer is configured to receive the residual output after downsampling and perform a global average pooling operation on the residual output after downsampling to generate a global average pooling tensor, and the fully connected layer is configured to receive the global average pooling tensor and generate the predicted output.

7. The display system according to claim 1, wherein the parallel branch layers of the inception module comprise a first branch layer, a second branch layer, and a third branch layer; the first branch layer comprises a convolution layer, a rectified linear unit layer, and a pooling layer; the second branch layer comprises a first convolution layer, a first rectified linear unit layer, a second convolution layer, and a second rectified linear unit layer; and the third branch layer comprises a first convolution layer, a first rectified linear unit layer, a second convolution layer, and a second rectified linear unit layer.

8. The display system according to claim 1, wherein the classification module and the overdrive module are integrated into an integrated circuit.

9. A display method, comprising:

step (a): receiving, by a classification module, an image, and obtaining a scene classification of the image based on the image; and step (b): selecting, by an overdrive module, at least one overdrive look-up table based on the scene classification to send an overdrive signal; wherein the classification module comprises a neural network module, and the step (b) comprises: step (c): receiving, by the neural network module, the image, and outputting a predicted output of the image; and step (d): generating, by the classification module, the scene classification based on the predicted output; wherein the neural network module comprises a pre-processing layer, an inception module, an addition module, and an output layer, the inception module comprises a plurality of parallel branch layers and a concatenation module, and the step (c) comprises:

step (c1): receiving, by the pre-processing layer, the image, and generating a dimension-reduced feature tensor;

step (c2): receiving, by each of the parallel branch layers of the inception module, the dimension-reduced feature tensor, and generating an inception feature tensor, and concatenating, by the concatenation module, the inception feature tensor of each branch layer to generate an output inception feature tensor;

step (c3): performing, by the addition module, an element-by-element addition operation on the output inception feature tensor and the dimension-reduced feature tensor to obtain a residual output; and step (c4): receiving, by the output layer, the residual output, and generating the predicted output.

10. The display method according to claim 9, wherein the pre-processing layer comprises a convolution module, a pixel unshuffling module, and a pooling layer, and the step (c1) comprises:

receiving, by the convolution module, the image, and generating an intermediate dimension-reduced feature tensor;

performing, by the pixel unshuffling module, pixel unshuffling on the intermediate dimension-reduced feature tensor based on a zoom-out factor to downsample the intermediate dimension-reduced feature tensor to generate a pixel unshuffling output; and performing, by the pooling layer, a pooling operation on the pixel unshuffling output to generate the dimension-reduced feature tensor.

11. The display method according to claim 10, wherein the pooling layer is a max pooling layer.

12. The display method according to claim 9, wherein the output layer comprises a downsampling module and an output generation module, and the step (c4) comprises:

step (c41): downsampling, by the downsampling module of the output layer, the residual output; and step (c42): generating, by the output generation module, the predicted output based on the residual output after downsampling.

13. The display method according to claim 12, wherein the downsampling module comprises a rectified linear unit layer and a pooling layer, and the step (c41) comprises:

step (c411): receiving and processing, by the rectified linear unit layer, the residual output; and step (c412): receiving, by the pooling layer, an output of the rectified linear unit layer, and performing a pooling operation on the output of the rectified linear unit layer to generate the residual output after downsampling.

14. The display method according to claim 12, wherein the output generation module comprises a global average pooling layer and a fully connected layer, and the step (c42) comprises:

step (c421); receiving, by the global average pooling layer, the residual output after downsampling, and performing a global average pooling operation on the residual output after downsampling to generate a global average pooling tensor; and step (c422): receiving, by the fully connected layer, the global average pooling tensor, and generating the predicted output.

15. The display method according to claim 9, wherein the parallel branch layers of the inception module comprise a first branch layer, a second branch layer, and a third branch layer; the first branch layer comprises a convolution layer, a rectified linear unit layer, and a pooling layer; the second branch layer comprises a first convolution layer, a first rectified linear unit layer, a second convolution layer, and a second rectified linear unit layer; and the third branch layer comprises a first convolution layer, a first rectified linear unit layer, a second convolution layer, and a second rectified linear unit layer; and the step (c2) comprises:

step (c21): receiving, by each of the first branch layer, the second branch layer, and the third branch layer, the dimension-reduced feature tensor, and generating the inception feature tensor; and step (c22): concatenating, by the concatenation module, the inception feature tensor of each of the first branch layer, the second branch layer, and the third branch layer to generate the output inception feature tensor.

16. A training system, comprising a processing module and a to-be-trained neural network module, wherein the to-be-trained neural network module comprises:

a pre-processing layer, configured to receive an input image and generate a dimension-reduced feature tensor;

an inception module, comprising a plurality of parallel branch layers and a concatenation module, each of the branch layers receiving the dimension-reduced feature tensor and generating an inception feature tensor, and the concatenation module concatenating the inception feature tensor of each branch layer to generate an output inception feature tensor;

an addition module, configured to perform an element-by-element addition operation on the output inception feature tensor and the dimension-reduced feature tensor to obtain a residual output; and an output layer, configured to receive the residual output and generate a predicted output; and the processing module is configured to perform the following in a training epoch:

step (a): repeatedly: using a training image in a training set as the input image; and obtaining a loss based on a classification label of the training image and the predicted output generated by the output layer corresponding to the training image; and (b) step (b): updating a plurality of parameters of the to-be-trained neural network module based on an average of all losses obtained in the step (a) and an update algorithm.

* * * * *